(12) United States Patent
Min

(10) Patent No.: US 9,662,793 B1
(45) Date of Patent: May 30, 2017

(54) STACK GRIPPER

(71) Applicant: Woosung Autocon Co., Ltd., Siheung-si (KR)

(72) Inventor: Sam Whan Min, Ansan-si (KR)

(73) Assignee: Woosung Autocon Co., Ltd., Siheung-si (KR)

( * ) Notice: Subject to any disclaimer, the term of this patent is extended or adjusted under 35 U.S.C. 154(b) by 0 days.

(21) Appl. No.: 15/356,676

(22) Filed: Nov. 21, 2016

(51) Int. Cl.
*B66F 19/00* (2006.01)
*B25J 15/00* (2006.01)
*B65G 1/14* (2006.01)

(52) U.S. Cl.
CPC ....... *B25J 15/0014* (2013.01); *B25J 15/0095* (2013.01); *B65G 1/14* (2013.01)

(58) Field of Classification Search
CPC   B25J 15/0014; B25J 15/0095; B25J 15/0009; B25J 9/042; B25J 9/102; B25J 19/0029; B25J 15/103; B65G 1/14; B66C 1/422; H01L 21/68707
USPC ................. 294/213, 106; 901/19, 25, 28, 31
See application file for complete search history.

(56) References Cited

U.S. PATENT DOCUMENTS

| | | | | |
|---|---|---|---|---|
| 7,284,946 B2 * | 10/2007 | O'Neil | ................ | B65H 15/02 414/763 |
| 8,260,458 B2 * | 9/2012 | Kim | ................ | B25J 9/1612 294/213 |
| 2006/0120850 A1 * | 6/2006 | Clark | ................ | B65G 57/03 414/789.5 |
| 2012/0065779 A1 * | 3/2012 | Yamaguchi | ................ | B25J 9/043 700/259 |
| 2012/0279342 A1 * | 11/2012 | Yasukawa | ................ | B25J 15/0009 74/490.03 |

* cited by examiner

*Primary Examiner* — Stephen Vu

(57) ABSTRACT

The stack gripper is provided in a robot to pick up and transport a box stack includes a fixing frame connected to a robot, a fixing panel provided at a lower portion of the fixing frame, a horizontal pressing member provided at the lower portion of the fixing frame to face the fixing panel and to be moved horizontally on the fixing frame, a vertical pressing member provided at a lower portion of the fixing frame to be moved vertically, and a fork member provided at the fixing frame to face the vertical pressing member and to be moved horizontally on the fixing frame.

7 Claims, 9 Drawing Sheets

STACK GRIPPER

RELATED APPLICATION

This application claims the benefit of priority of Korean Patent Application No. 10-2015-0163400 filed Nov. 20, 2015, the contents of which are incorporated herein by reference in their entirety.

FIELD AND BACKGROUND OF THE INVENTION

The present invention relates to a stack gripper, and more specifically, to a stack gripper which allows a regularly stacked box stack to be picked up and transported in a state in which the box stack is automatically arranged by pressing the box stack in horizontal and vertical directions.

Generally, a handler, a robot, a transfer machine, and the like include grippers with various structures to optimally grip objects to handle, transfer, and stack various articles, components, and so on, wherein the grippers are also referred to as a hand or an end effector.

Grippers are classified into mechanical grippers, vacuum grippers, and magnetic grippers depending on an operation method. Mechanical grippers grip an object by operating two to four fingers using a pneumatic, hydraulic, electrical, and spring operation.

Grippers should be designed with a structure in which they can perform efficiently and stably according to the properties of the object.

Particularly, a gripper for a pack handler is disclosed in Korean Registered Patent No. 10-0622664 (hereinafter, referred to as Prior-Art Document 1). The gripper for a pack handler includes a first rotary plate mounted on one side of a frame to rotate on first and second shafts arranged along a Y-axis line, a second rotary plate mounted on the other side of the frame to rotate on third and fourth shafts arranged along the Y-axis line, first and second fingers stretched out at a lower portion of the first rotary plate in parallel to each other to grip one side of a pack by rotating on a Z-axis line; third and fourth fingers stretched out at a lower portion of the second rotary plate in parallel to each other to grip the other side of the pack by rotating on the Z-axis line, a first operation device including a first air cylinder mounted at the front side of the frame and connected to the first rotary plate and making the first and second rotary plates interwork with each other by an operation of the first air cylinder, a second operation device including a second air cylinder mounted at an upper surface of the first rotary plate and making the first and second fingers interwork with each other by an operation of the second air cylinder, and a third operation device including a third air cylinder mounted on an upper surface of the second rotary plate and making the third and fourth fingers interwork with each other by an operation of the third air cylinder.

The gripper for a pack handler can efficiently and accurately stack packs in a box by minimizing strokes of fingers with a structure in which the fingers place the gripped packs by simultaneously rotating on a Y-axis line and a Z-axis line, and increase reliability by preventing a malfunction.

However, there is a disadvantage in that the gripper disclosed in Prior Art Document 1 is not applied to packing boxes manufactured one at a time due to the properties of the boxes.

That is, the packing boxes are manufactured one at a time, and boxes manufactured one at a time should be transported with the predetermined number of boxes stacked during transportation. Thus, the fingers of the gripper are in contact with both sides of the stacked boxes when the gripper in Prior Art Document 1 lifts the stacked boxes, and the boxes stacked on other sides with which fingers are not contact are in disorder and fall when the boxes are transported, and thus there is a disadvantage of difficulty of transportation.

The gripper for a handler described above is described in detail in the following Prior Art Document, the detailed description of which will be omitted.

(Patent Document 1) Korean Registered Patent No 10-0622664.

SUMMARY OF THE INVENTION

The present invention is directed to a stack gripper capable of automatically arranging a plurality of packing boxes, which are manufactured one at a time and stacked in predetermined number, in horizontal and vertical directions in a state in which the packing boxes are stacked and picking up and transporting the box stack.

According to an aspect of the present invention, there is provided a stack gripper including a fixing frame connected to a robot, a fixing panel provided at a lower portion of the fixing frame, a horizontal pressing member provided at a lower portion of the fixing frame to face the fixing panel and horizontally moved on the fixing frame, a vertical pressing member provided at a lower portion of the fixing frame and moved vertically, and a fork member provided on the fixing frame to face the vertical pressing member and moved horizontally on the fixing frame.

The stack gripper may further include a motor provided on the fixing frame, a gear box connected to the motor to be operated, an upper shaft connected to the gear box to be rotated, pulleys rotatably provided on the upper shaft and the fixing frame, and a belt configured to connect the pulley of the upper shaft with the pulley of the fixing frame and having the fork member fixed to one side thereof. The fork member may be moved horizontally as the belt is moved by the upper shaft.

The stack gripper may further include a lifting cylinder provided in the fixing panel, and a lifting unit provided on the lifting cylinder to be moved vertically and having the vertical pressing member to be fixed thereto. The vertical pressing member may be moved vertically by the lifting unit.

The stack gripper may further include a guide rail provided on the fixing panel on each side of the lifting cylinder and coupled to the vertical pressing member to guide the vertical pressing member.

The stack gripper may further include a lower shaft rotatably provided on the fixing panel, a stopper fixed to the lower shaft, and a rotating cylinder having both ends rotatably provided on the fixing panel and the stopper. The stopper may be rotated by the rotating cylinder to prevent a box to be discharged along the fork member from escaping.

BRIEF DESCRIPTION OF THE SEVERAL VIEWS OF THE DRAWINGS

The above and other objects, features and advantages of the present invention will become more apparent to those of ordinary skill in the art by describing in detail exemplary embodiments thereof with reference to the accompanying drawings, in which.

DESCRIPTION OF SPECIFIC EMBODIMENTS OF THE INVENTION

Hereinafter, exemplary embodiments of the invention will be described in detail with reference to the accompanying drawings.

The terminology used herein is defined in consideration of functions in the embodiments, and meanings may vary depending on, for example, a user or operator's intentions or customs. Therefore, the meanings of terms used in the embodiments should be interpreted based on the scope throughout this specification.

In addition, the embodiment disclosed does not limit the scope of the present invention, but corresponds to merely exemplary terms of constituent elements presented in the claims of the present invention, and the embodiments that include replaceable constituent elements as equivalents of the constituent elements defined in the overall specification and claims may be included in the scope of the present invention.

In this following specification, selective terms are used to distinguish one component from another, but these components are not limited by these terms. In descriptions of the invention, detailed descriptions of related well-known functions that unnecessarily obscure the gist of the invention may be omitted.

FIGS. 1 to 9 are views illustrating a stack gripper according to an embodiment of the present invention.

Figure 1:
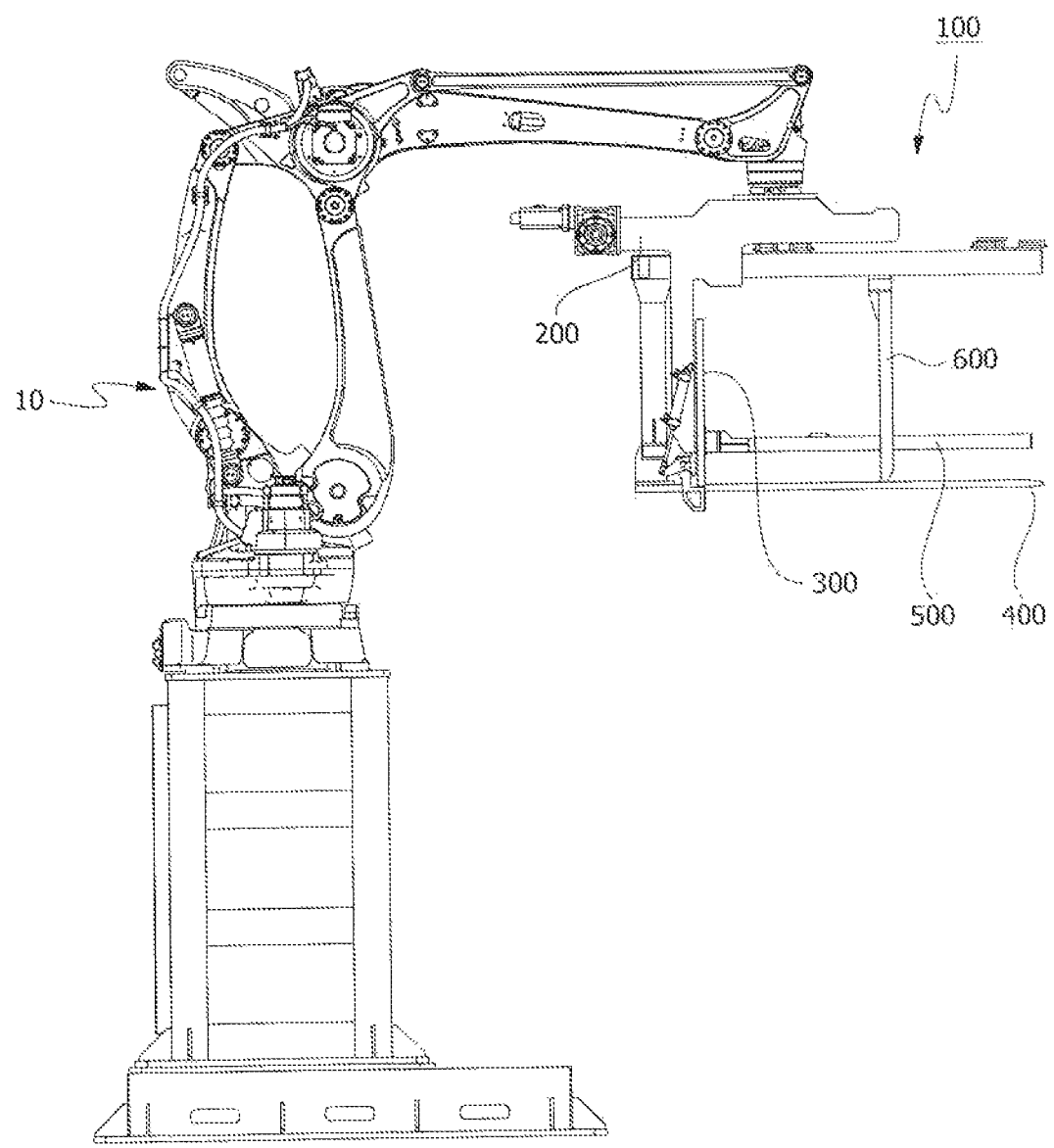
FIG. 1 is an overall schematic view of a stack gripper according to an embodiment of the present invention.
Figure 2:
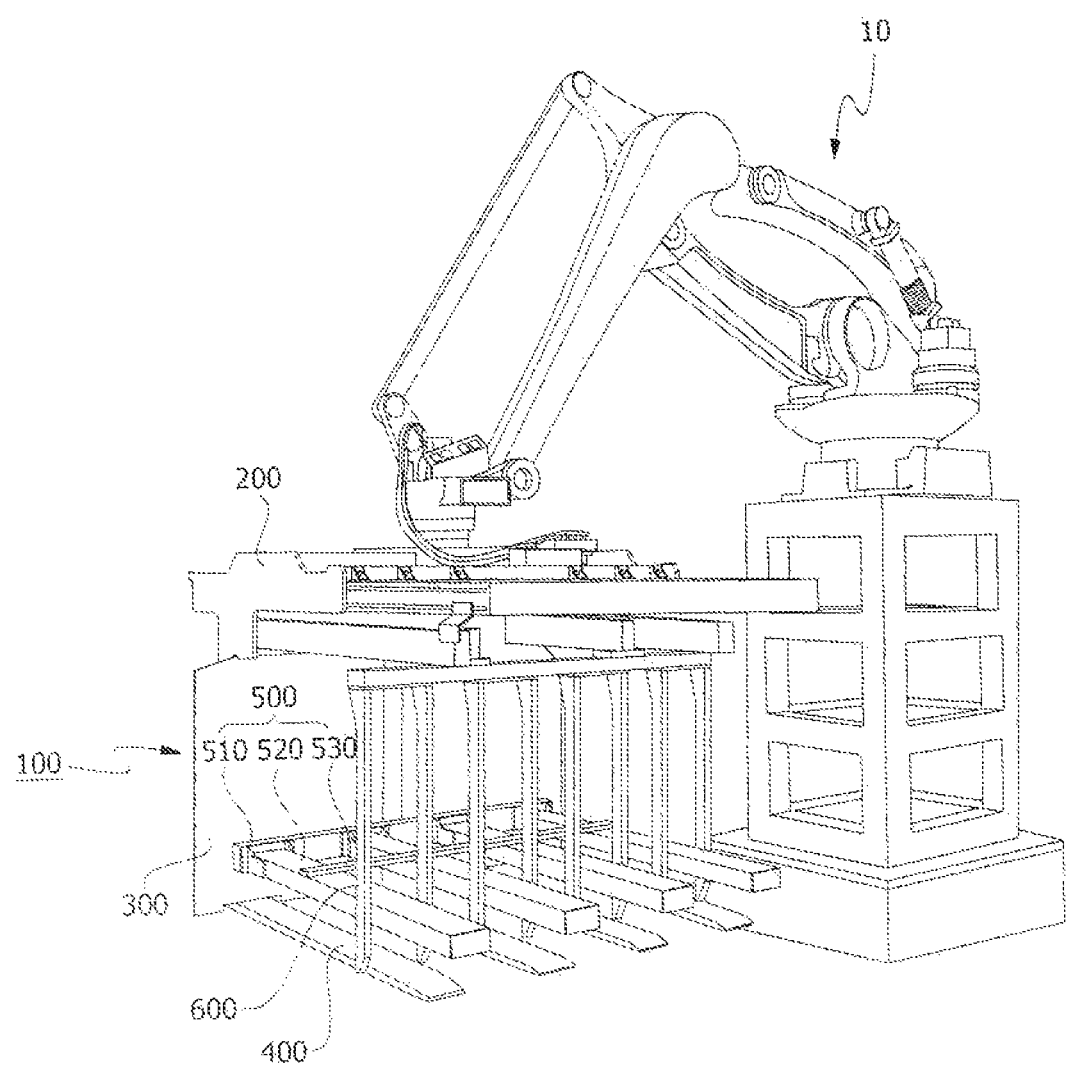
FIG. 2 is a front perspective view of the stack gripper according to the embodiment of the present invention.
Figure 3:
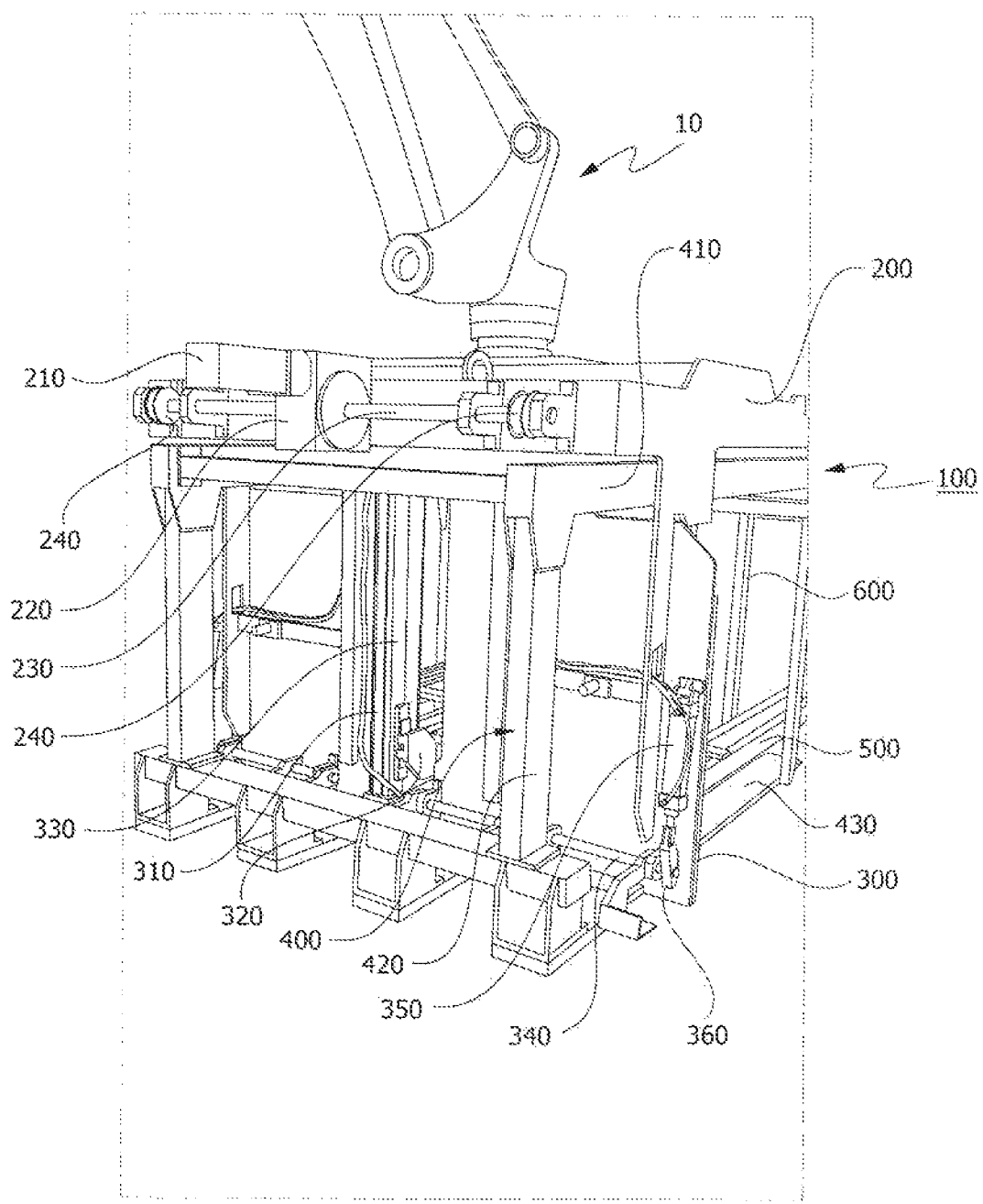
FIG. 3 is a rear perspective view of the stack gripper according to the embodiment of the present invention.

A stack gripper 100 according to the embodiment of the present invention, as shown in FIGS. 1 to 3, is provided to be fixedly coupled to a multi-articulated robot 10.

The multi-articulated robot 10 is a robot which is rotatable and bendable in X, Y, and Z axis directions, and the stack gripper 100 may be rotatably provided at an end of the robot 10.

The stack gripper 100, as shown in FIGS. 1 to 3, includes a fixing frame 200 connected to the robot 10, fixing panels 300 provided at the fixing frame 200, a horizontal pressing member 600 provided at the fixing frame 200 to face the fixing panel 300 and move horizontally, a vertical pressing member 500 provided at the fixing frame 200 to move vertically, and a fork member 400 provided at the fixing frame 200 to face the vertical pressing member 500 and move horizontally.

Figure 6:
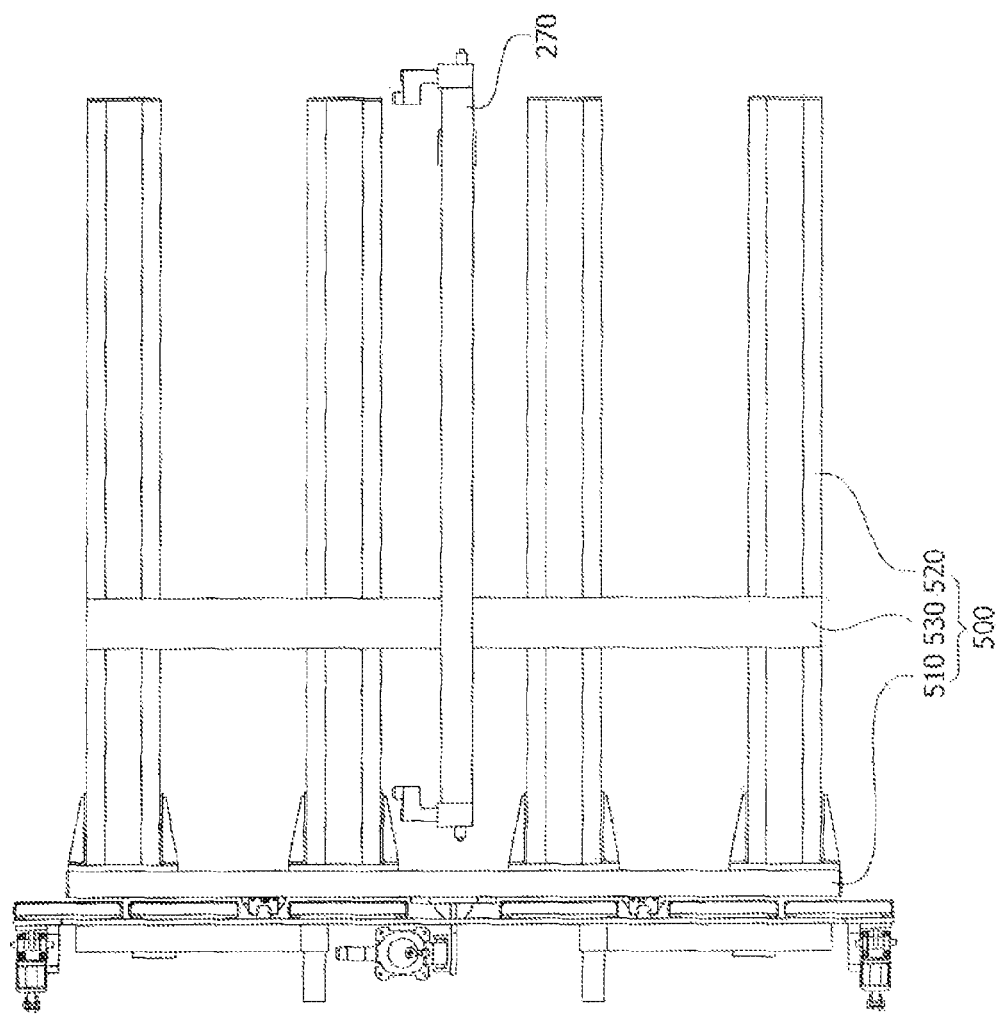
FIG. 6 is a top view of the main parts of the stack gripper according to the embodiment of the present invention.

The fixing frame 200 which includes a plurality of frames installed in a rectangular frame in parallel, as shown in FIG. 6, has an upper surface to which an end of the robot 10 is connected and guides a fork member 400 and a horizontal pressing member 600 to be moved.

A motor 210 is provided on an upper surface of one side of the fixing frame 200 to be rotatable forward and backward, and a gearbox 220 is provided on an end of the motor 210. The gearbox 220 includes a plurality of gears provided therein to output power input from the motor 210 to an upper shaft 230 described below. In this case, the gearbox 220 decreases or increases power of the motor 210 to transfer the power to the upper shaft 230.

Meanwhile, an upper shaft 230 is rotatably provided in the fixing frame 200 on a lower portion of the gearbox 220, and pulleys 240 are fixedly provided on both ends of the upper shaft 230 to integrally rotate with the upper shaft 230.

Also, pulleys 260 corresponding to the pulleys 240 of the upper shaft 230 are rotatably provided at the fixing frame 200 apart from the pulley 240 of the upper shaft 230 on the same line, and the opposite pulleys 240 and 260 on the same line are provided to be connected by a belt 250.

The fork member 400 is fixedly connected to the belt 250, so that the belt 250 is moved between the opposite pulleys 240 and 260 by the rotation of the upper shaft 230. The fork member 400 is horizontally moved by the movement of the belt 250.

Also, a moving cylinder 270 is provided in the center of the fixing frame 200 provided as described above to move the horizontal pressing member 600 in a horizontal direction. The moving cylinder 270 does not have a rod, and the horizontal pressing member 600 is directly connected to the moving cylinder 270 to be moved. Therefore, the horizontal pressing member 600 moved by the moving cylinder 270 is moved toward or away from the fixing panel 300.

Figure 4:
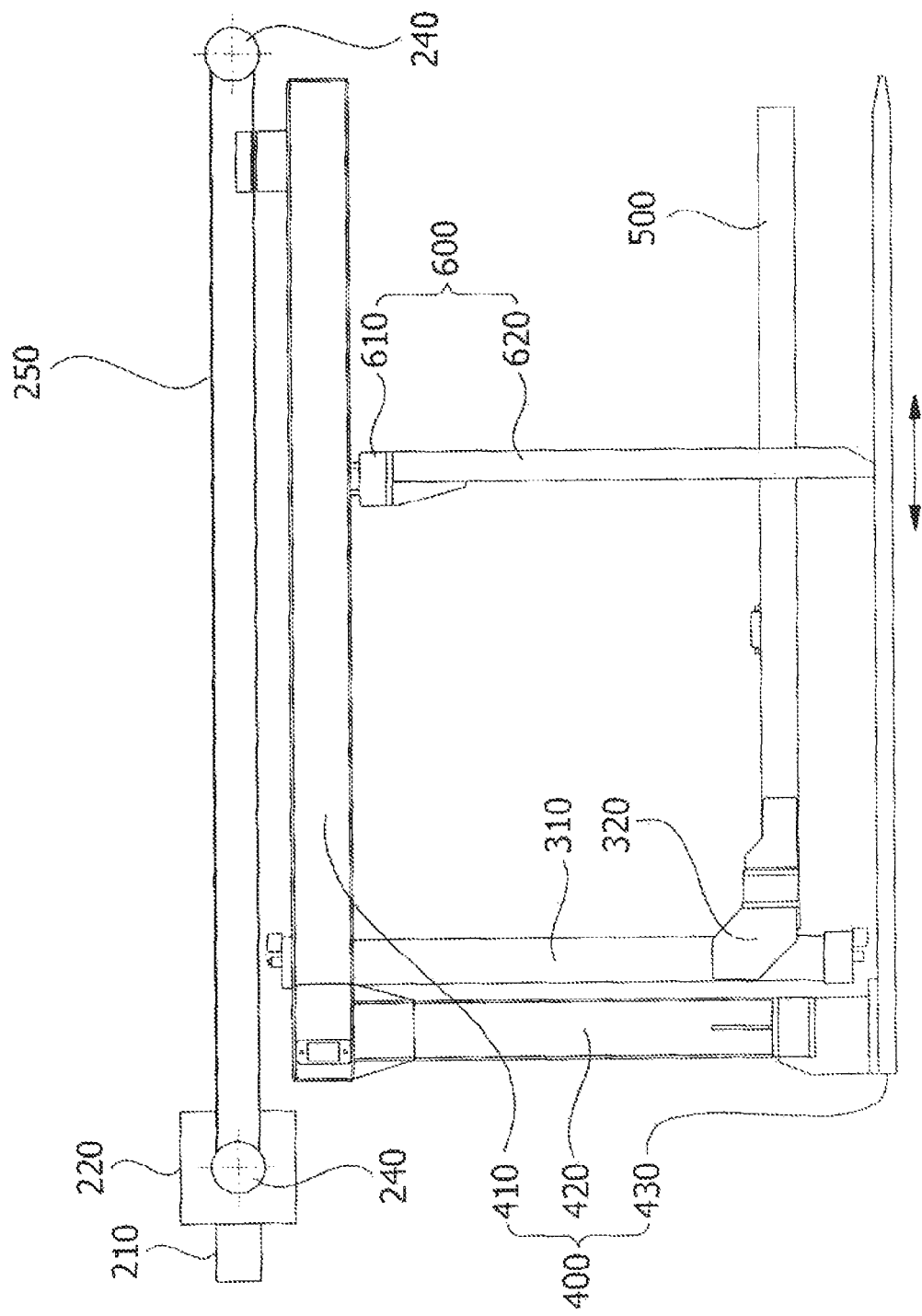
FIG. 4 is a side view of main parts of the stack gripper according to the embodiment of the present invention.
Figure 5:
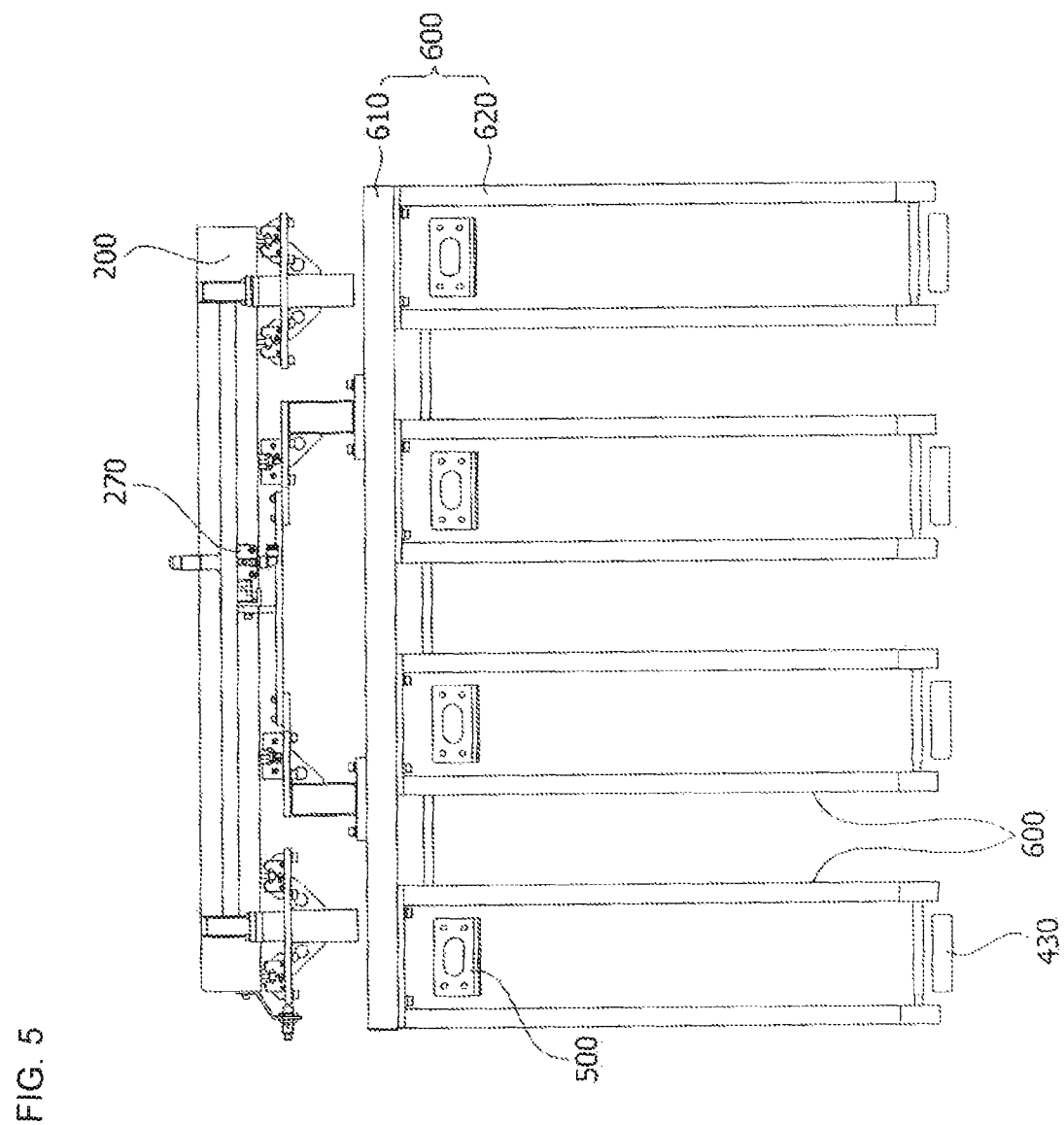
FIG. 5 is a front view of the main parts of the stack gripper according to the embodiment of the present invention.

The fork member 400, which is a '⊂'-shaped frame, as shown in FIGS. 4 and 5, includes a plurality of upper frames 410 movably coupled to a lower surface of the fixing frame 200, a rectangular connection frame 420 vertically coupled to one ends of the upper frames 410, and a plurality of fork frames 430 vertically coupled to a lower end of the connection frame 420 and provided to face the upper frames 410.

Particularly, the upper frames 410 of the fork member 400 are provided to be fixed to the belt 250, and the connection frame 420 connecting the upper frames 410 and the fork frames 430 is positioned at the outside of the rear side of the fixing panel 300 to horizontally move the fork member 400.

Therefore, the fork member 400 is moved horizontally in the front and rear directions with the belt 250 rotating on the opposite pulleys 240 and 260 by the operation of the motor 210.

A box stack BS to be transported is placed on the fork frames 430 of the fork member 400 provided as described above and is transported.

The fixing panel 300 vertically protruding from a lower portion of the fixing frame 200, as shown in FIGS. 3 and 4, is provided at a rear end of the fixing frame 200, and it is preferable that the fixing panel 300 be positioned at a front part of the connection frame 420 of the fork member 400.

A lifting cylinder 310 is provided at the fixing panel 300 to move the vertical pressing member 500 vertically, a lifting unit 320 is coupled to the lifting cylinder 310 to be vertically moveable, and the vertical pressing member 500 is fixedly provided on the lifting unit 320.

Particularly, the lifting cylinder 310 is provided as a cylinder which does not have a rod, like the moving cylinder 270 described above. The lifting unit 320 is moved directly and vertically in the lifting cylinder 310 according to the flow of oil pressure supplied to the lifting cylinder 310, and then the vertical pressing member 500 is moved vertically by the movement of the lifting unit 320 to approach the upper frames 410 or the fork frames 430 of the fork member 400.

Meanwhile, a plurality of guide rails 330 are provided on the fixing panels 300 on both sides of the lifting cylinder 310 in parallel to the lifting cylinder 310, and the vertical pressing member 500 is movably coupled to the guide rail 330 and is stably lifted by the guide rail 330 when the vertical pressing member 500 is moved vertically.

Figure 8:
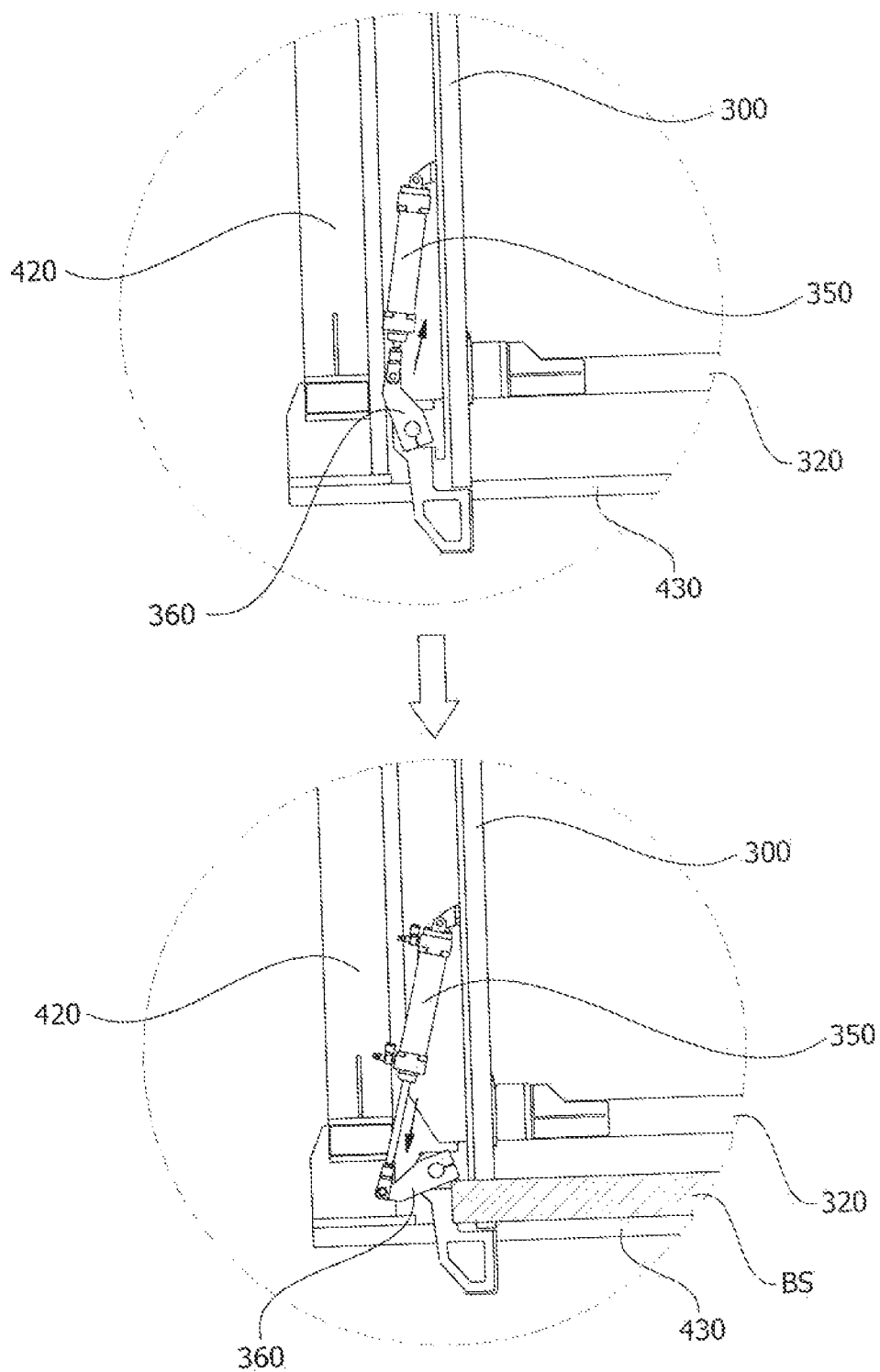
FIG. 8 is a schematic view of a stopper provided in a fixing panel according to the embodiment of the present invention.
Figure 9:
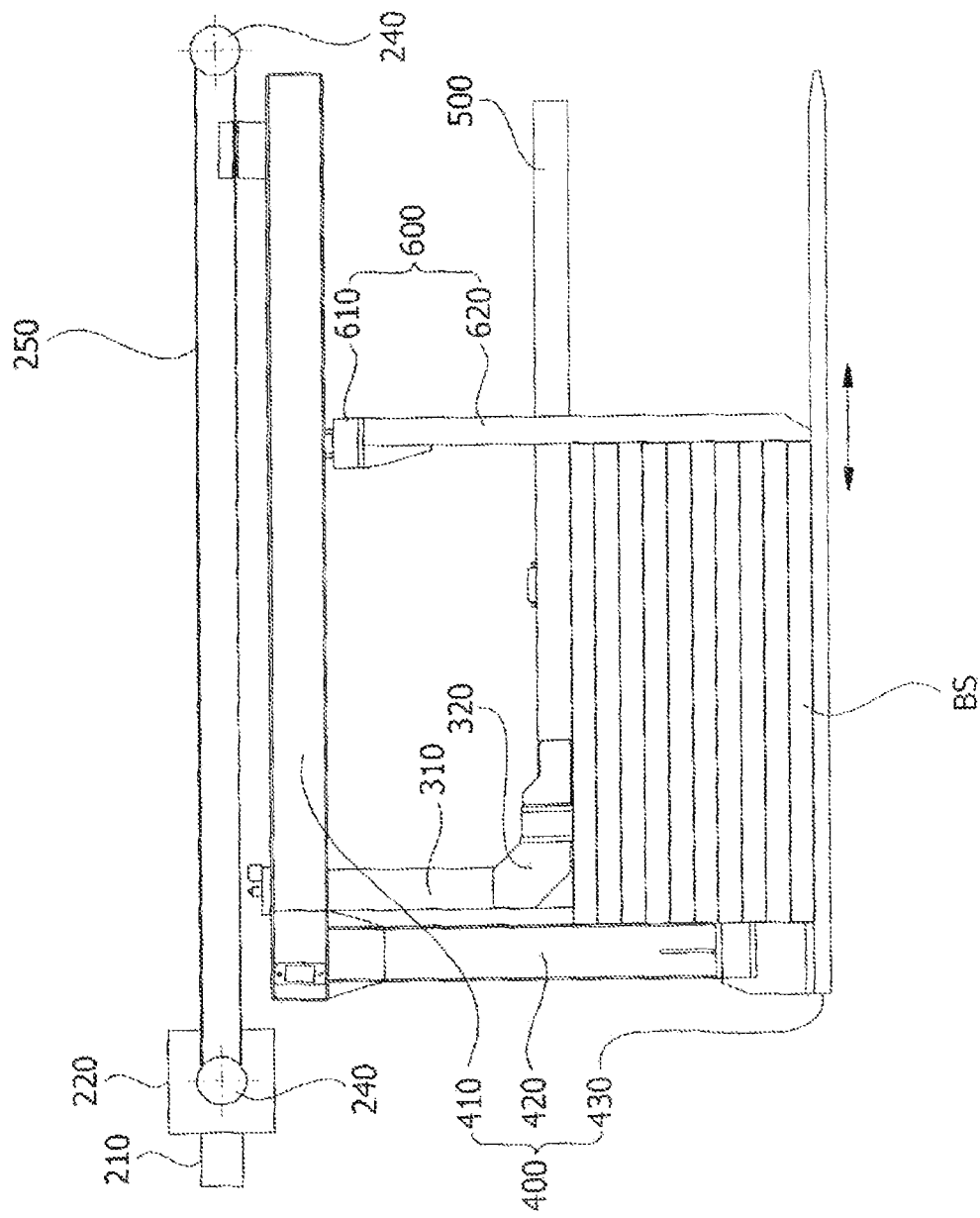
FIG. 9 is a view of a state in which a box stack is gripped by the stack gripper according to the embodiment of the present invention.

Further, a lower shaft 340, as shown in FIG. 8, is provided in a lower portion of a rear surface of the fixing panel, and stoppers 360 are provided on both ends of the lower shaft 340. That is, when the lower shaft 340 is rotatably provided at the lower portion of the rear surface of the fixing panel 300 by a bearing, the stoppers 360 are fixedly provided on both ends of the lower shaft 340, or when the lower shaft 340 is fixedly provided at the lower portion of the rear surface of the fixing panel 300, the stoppers 360 are rotatably provided on both ends of the lower shaft 340, and thus the stoppers 360 are rotated with the lower shaft 340 or are rotated separately from the fixed lower shaft 340.

Meanwhile, a case in which the lower shaft 340 is provided at a lower portion of a rear surface of the fixing panel 300 by a bearing as a medium and the stoppers 360 are also fixedly provided on both ends of the lower shaft 340 will be described in the embodiment as an exemplary example.

Therefore, both ends of a rotating cylinder 350 are rotatably coupled to the fixing panel 300 and the stopper 360. As a cylinder rod is discharged from the rotating cylinder 350, the stopper 360 is rotated forward with the lower shaft 340 downward and protrudes between the fork frames 430 to block the lowest box stacked on an upper surface of the fork frames 430 from being discharged along the fork frames 430 when the fork member 400 is moved backward (away from the fixing panel 300), thereby preventing the box from escaping.

The vertical pressing member 500 moved vertically from a lower portion of the fixing frame 200 by the lifting cylinder 310, as shown in FIGS. 4 to 6, includes a lifting frame 510 fixedly installed on the lifting unit 320 provided in the lifting cylinder 310, and a plurality of pressing frames 520 installed a predetermined distance apart from a front surface of the lifting frame 510.

The center of the lifting frame 510 of the vertical pressing member 500 is fixed to the lifting unit 320, and both sides thereof are movably coupled to both guide rails 330 provided on the fixing panel 300. Therefore, when the lifting frame 510 is moved vertically by the lifting unit 320, both sides of the lifting frame 510 are guided by the guide rails 330 and moved, and thus the lifting frame can induce a stable lifting operation.

The plurality of pressing frames 520 include reinforcing frames 530 perpendicular to the plurality of pressing frames 520 installed in the centers of the upper surfaces or the rear parts of the pressing frames 520 (a portion near the fixing panel 300) to reduce moment applied to the pressing frames 520 when the box stack BS stacked on the fork frames 430 of the fork member 400 is pressurized, thereby reinforcing the pressing frames 520. Although a reinforcing effect is increased when the reinforcing frames 530 are provided closer to front ends of the pressing frames 520, the reinforcing frames 530 are provided in the centers or the rear parts of the pressing frames 520 to avoid interference with the horizontal pressing member 600 when the horizontal pressing member 600 performs pressurization, and the reinforcing frames 530 are positioned in an area of the box stack BS to be gripped.

Meanwhile, when the vertical pressing member 500 is moved toward the fork frames 430 of the fork member 400 by the lifting cylinder 310, the vertical pressing member 500 presses and arranges an upper surface of the box stack BS between the fork frames 430. On the other hand, when the vertical pressing member 500 is moved away from the fork frames 430, the holding of the box stack BS is released.

Also, the horizontal pressing member 600 moved horizontally at a lower portion of the fixing frame 200 by the moving cylinder 270, as shown in FIGS. 4 to 6, includes an upper frame 610 provided in the moving cylinder 270 to be movable, and a plurality of pressing frames 620 installed at a lower surface of the upper frame 610 at regular intervals.

The upper frame 610 of the horizontal pressing member 600 is positioned in a direction perpendicular to the lower portions of the upper frames 410 of the fork member 400 and is provided in the moving cylinder 270. The multiple pressing frames 620 are fixedly coupled to a lower surface of the upper frame 610 by a fixing part such as a bolt.

Therefore, when the horizontal pressing member 600 is moved horizontally toward the fixing panel 300 by the moving cylinder 270, the horizontal pressing member 600 presses and arranges the box stack BS between the fixing panel 300 and the horizontal pressing member 600 in a horizontal direction. On the other hand, when the horizontal pressing member 600 is moved away from the fixing panel 300, the holding of the box stack BS is released.

In this case, the pressing frames 620 of the horizontal pressing member 600 are positioned to intersect with the pressing frames 520 of the vertical pressing member 500 and the fork frames 430 of the fork member 400 to avoid interference with the pressing frames 520 and the fork frames 430 when a pressure is applied.

The operation relation of the stack gripper of the embodiment of the present invention will be described.

Figure 7:
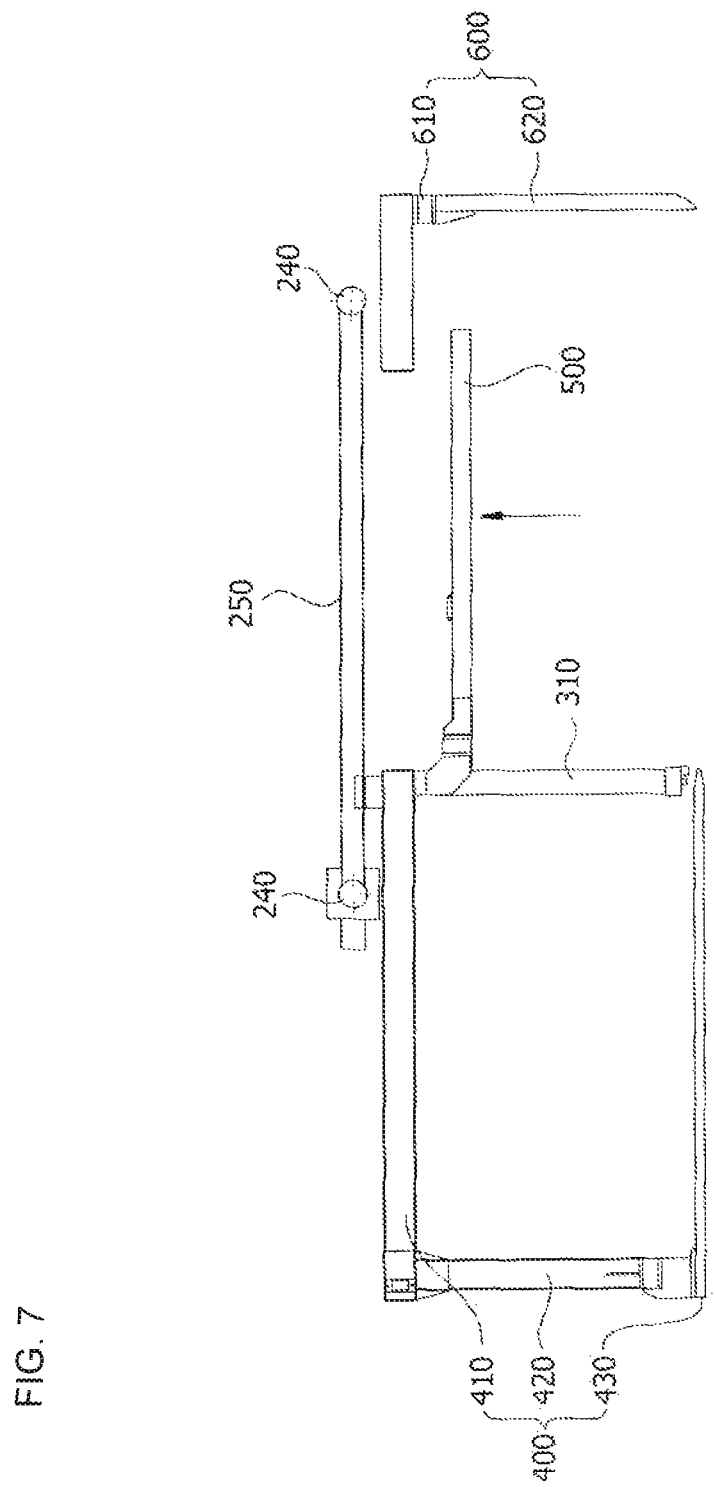
FIG. 7 is a view of an initial state of FIG. 4.

To pick up the box stack BS moved by conveyor rollers in a state in which the box stack BS manufactured one box at a time is stacked, as shown in FIG. 7, the fork member 400 and the horizontal pressing member 600 are spaced apart from each other, and the vertical pressing member 500 is increased toward the upper frames 410 of the fork member 400, so as wide an inner space as possible is ensured.

That is, when the fork member 400 is moved, the motor 210 on the fixing frame 200 is operated, and the upper shaft 230 is rotated backward through the gear box 220. When the upper shaft 230 is rotated backward, the belt 250 is rotated backward between both pulleys 240 and 260, and thus the fork member 400 fixed to the belt 250 is moved toward the robot 10 in a rear direction.

When the moving cylinder 270 on the fixing frame 200 is operated, the horizontal pressing member 600 is moved away from the fixing panel 300. When the lifting cylinder 310 of the fixing panel 300 is operated, the vertical pressing member 500 moves the lifting unit 320 toward an upper portion of the lifting cylinder 310, and thus the vertical pressing member 500 fixed to the lifting unit 320 is lifted toward the upper frames 410 of the fork member 400.

Then, when the robot 10 with the stack gripper 100 is operated in the above state, the stack gripper 100 is positioned at an upper portion of the box stack BS of a conveyor, and then the stack gripper 100 is lowered, and thus the box stack BS is inserted into an inner space formed by the fixing panel 300, the horizontal pressing member 600, and the vertical pressing member 500, through an open lower portion of the stack gripper 100.

Then, although not shown in the drawings, a lifting panel provided at a lower portion of the conveyor roller protrudes from an upper portion of the conveyor roller in the above state, and thus the box stack BS is pushed above the conveyor roller and is inserted into the inner space of the stack gripper 100 at the same time. In this case, the lifted box stack BS has to be lifted above the fork frames 430 of the fork member 400.

The motor 210 on the fixing frame 200 is operated in reverse to rotate the upper shaft 230 forward, and the belt 250 is rotated forward between both pulleys 240 and 260 by the forward rotating upper shaft 230, and then the fork member 400 fixed to the belt 250 is moved forward toward the fixing panel 300. Thus, the fork frames 430 of the fork member 400 are inserted into the lower portion of the box stack BS to support the box stack BS.

When the moving cylinder 270 on the fixing frame 200 is operated in reverse, the horizontal pressing member 600 is moved toward the fixing panel 300 to press and arrange the box stack BS stacked between the pressing frames 620 of the horizontal pressing member 600 and the fixing panel 300 in a horizontal direction. The lifting cylinder 310 of the fixing panel 300 is also operated in reverse to lower the vertical pressing member 500 through the lifting unit 320, and the pressing frames 520 of the vertical pressing member 500 press an upper surface of the box stack BS, and thus the box stack BS is vertically arranged between the pressing frames 520 of the vertical pressing member 500 and the fork frames 430 of the fork member 400 (see FIG. 9).

Therefore, after the stack gripper 100 lifts the pressurized and arranged box stack BS and then is transferred on the pallet, the stack gripper 100 is operated in reverse, and the fork member 400 and the horizontal pressing member 600 are spaced apart from each other, and thus the vertical pressing member 500 is moved upward to move the box stack BS being held by the vertical pressing member 500 to an upper portion of the pallet.

In this case, before the fork member 400 is moved, as shown in FIG. 8, the rotating cylinder 350 provided at a rear lower end of the fixing panel 300 is operated to discharge the cylinder rod, and the stoppers 360 are rotated with the lower shaft 340 by the discharged cylinder rod to protrude between the fork frames 430. When the fork member 400 is moved in a rear direction, the lowest box of the boxes stacked on an upper surface of the fork frames 430 is prevented from being discharged along the fork frames 430, thereby preventing the box from being in disorder.

The stack gripper 100 of the embodiment of the present invention quickly presses and automatically arranges multiple stacked packing boxes in horizontal and vertical directions, and quickly transports the stacked box stack BS without disorder by lifting the arranged box stack BS, thereby conveniently performing post-processing.

The stack gripper according to the embodiment of the present invention can quickly transport multiple stacked packing boxes without disorder of the stacked box stack by pressing and automatically arranging the multiple stacked packing boxes with a vertical pressing member and a horizontal pressing member in horizontal and vertical directions and lifting the arranged box stack with a fork member. Therefore, there is an advantage of conveniently performing the post-processing of the transferred box stack.

The invention has been described in detail with reference to the exemplary embodiments. However, the exemplary embodiments should be considered in a descriptive sense only, and the invention is not limited thereto. It will be clear to those skilled in the art that various modifications and improvements within the scope of the invention may be made.

Simple modifications and alterations of the invention fall within the scope of the invention and the scope of the invention is defined by the accompanying claims.

DESCRIPTION OF SYMBOLS

10: ROBOT
100: GRIPPER
200: FIXING FRAME
210: MOTOR
220: GEARBOX
230: UPPER SHAFT
240, 260: PULLEY
250: BELT
270: MOVING CYLINDER
300: FIXING PANEL
310: LIFTING CYLINDER
320: LIFTING UNIT
330: GUIDE RAILS
340: LOWER SHAFT
350: ROTATING CYLINDER
360: STOPPER
400: FORK MEMBER
410: UPPER FRAME
420: CONNECTION FRAME
430: FORK FRAME
500: VERTICAL PRESSING MEMBER
510: LIFTING FRAME
520: PRESSING MEMBER
530: REINFORCING FRAME
600: HORIZONTAL PRESSING MEMBER
610: UPPER FRAME
620: PRESSING FRAME
BS: BOX STACK

What is claimed is:

1. A stack gripper provided in a robot to pick up and transport a box stack, the stack gripper comprising:
a fixing frame connected to a robot;
a fixing panel provided at a lower portion of the fixing frame; a horizontal pressing member provided at a lower portion of the fixing frame to face the fixing panel and configured to be moved horizontally on the fixing frame;
a vertical pressing member provided at a lower portion of the fixing frame and configured to be moved vertically;
a fork member provided on the fixing frame to face the vertical pressing member and configured to be moved horizontally on the fixing frame;
a motor provided on the fixing frame;
a gear box connected to the motor to be operated;
an upper shaft connected to the gear box to be rotated; pulleys rotatably provided to the upper shaft and the fixing frame; and
a belt configured to connect the pulley of the upper shaft with the pulley of the fixing frame and having the fork member fixed to one side thereof,
wherein the fork member is moved horizontally as the belt is moved by the upper shaft.

2. The stack gripper of claim 1, further comprising:
a lifting cylinder provided in the fixing panel; and a lifting unit provided on the lifting cylinder to be moved vertically and having the vertical pressing member to be fixed thereto, wherein the vertical pressing member is moved vertically by the lifting unit.

3. The stack gripper of claim 2, further comprising a guide rail provided on the fixing panel on each side of the lifting cylinder and coupled to the vertical pressing member to guide the vertical pressing member.

4. The stack gripper of claim 2, further comprising:
a lower shaft rotatably provided on the fixing panel;
a stopper fixed to the lower shaft; and
a rotating cylinder having both ends rotatably provided on the fixing panel and the stopper;
wherein the stopper is rotated by the rotating cylinder to prevent a box to be discharged along the fork member from escaping.

5. The stack gripper of claim 1, further comprising:
a lifting cylinder provided in the fixing panel; and
a lifting unit provided on the lifting cylinder to be moved vertically and having the vertical pressing member to be fixed thereto, wherein the vertical pressing member is moved vertically by the lifting unit.

6. The stack gripper of claim 5, further comprising a guide rail provided on the fixing panel on each side of the lifting cylinder and coupled to the vertical pressing member to guide the vertical pressing member.

7. The stack gripper of claim 5, further comprising:
a lower shaft rotatably provided on the fixing panel;
a stopper fixed to the lower shaft; and
a rotating cylinder having both ends rotatably provided on the fixing panel and the stopper;
wherein the stopper is rotated by the rotating cylinder to prevent a box to be discharged along the fork member from escaping.

* * * * *

UNITED STATES PATENT AND TRADEMARK OFFICE
CERTIFICATE OF CORRECTION

PATENT NO. : 9,662,793 B1  
APPLICATION NO. : 15/356676  
DATED : May 30, 2017  
INVENTOR(S) : Sam Whan Min et al.

Page 1 of 1

It is certified that error appears in the above-identified patent and that said Letters Patent is hereby corrected as shown below:

On the Title Page

Insert the following:  
Item -- (30) Foreign Application Priority Data  
Nov. 20, 2015 (KR)............. 10-2015-0163400 --

Signed and Sealed this  
Second Day of January, 2018

Joseph Matal  
*Performing the Functions and Duties of the*  
*Under Secretary of Commerce for Intellectual Property and*  
*Director of the United States Patent and Trademark Office*